United States Patent [19]

Single, II

[11] Patent Number: 5,279,459

[45] Date of Patent: Jan. 18, 1994

[54] MULTIPLE TEMPERATURE CONTROL SYSTEM FOR AN AUTOMOTIVE VEHICLE

[75] Inventor: Arthur W. Single, II, Plymouth, Mich.

[73] Assignee: Ford Motor Company, Dearborn, Mich.

[21] Appl. No.: 36,291

[22] Filed: Mar. 24, 1993

[51] Int. Cl.⁵ .............................................. B60L 1/02
[52] U.S. Cl. ...................................... 237/2 A; 219/202
[58] Field of Search ......................... 237/2 A, 12.3 A, 12.3 B, 12.3 C; 219/202, 203, 219/204; 236/91 F, 91 D; 165/42·

[56] References Cited

U.S. PATENT DOCUMENTS

| | | |
|---|---|---|
| 4,232,211 | 11/1980 | Hill . |
| 4,459,466 | 7/1984 | Nakagawa et al. . |
| 4,562,957 | 1/1986 | Nakagawa et al. . |
| 4,759,269 | 7/1988 | Brown et al. . |
| 5,062,473 | 11/1991 | Ostrand et al. . |
| 5,187,349 | 2/1993 | Curhan et al. ................. 219/202 |

Primary Examiner—Henry A. Bennett
Attorney, Agent, or Firm—Raymond L. Coppiellie; Roger L. May

[57] ABSTRACT

A multiple temperature control system for a motor vehicle comprises a plurality of supplemental heat sources downstream from the air conditioner/heater unit which may be controlled to provide extra-heated air to either the driver position or the passenger position within the passenger compartment of the motor vehicle.

15 Claims, 1 Drawing Sheet

MULTIPLE TEMPERATURE CONTROL SYSTEM FOR AN AUTOMOTIVE VEHICLE

FIELD OF THE INVENTION

This invention relates generally to a multiple temperature control system for an automotive vehicle. More particularly, the invention is directed to a system employing a plurality of supplemental heat sources in separate air distribution ducts for elevating the temperature of air being discharged from a selected one of said air distribution ducts.

BACKGROUND OF THE INVENTION

In conventional air conditioning/heating systems for automotive vehicles, hot air and/or cool, conditioned air is produced by one or more heat exchange devices, and thereafter discharged into the passenger compartment through an assemblage of manifolded ducts and air registers. The temperature of the discharged air generally is controlled by a single control device which operates to maintain a constant average temperature in the passenger compartment of the vehicle. Thus, air at a uniform temperature is discharged at various velocities and flow rates as established by duct sizes and register settings into various portions of the passenger compartment. A conventional air conditioning/heating system cannot provide air heated to different temperatures to selected regions of the vehicle passenger compartment.

There are occasions when the driver of a motor vehicle would prefer that warmer air were being discharged into his portion of the passenger compartment, while cooler air is being discharged toward the passenger seat; conversely, there are occasions when the passengers of a motor vehicle would prefer receiving warmer air than the driver from the air conditioning/heating system. Similarly, there are occasions when passengers in rear seating positions would prefer warm air for one and cooler air for another, different than the driver of the vehicle.

U.S. Pat. No. 4,562,957 to Nakagawa et al. discloses an air conditioning/heating system for automobiles, wherein a sidestream of air from an otherwise conventional air conditioning/heating unit is further heated by a supplemental electrical resistance heater and communicated to a discharge register on the steering column, to provide warmer air to the driver's position while less warm air is being provided to the remainder of the passenger compartment. The Nakagawa et al. design, however, cannot provide warmer air to the passenger compartment while at the same time providing lower temperature air through the sidestream air discharge register to the driver's position, nor provide air at higher and lower temperatures than the driver's preferred temperature to a plurality in a plurality of seating positions.

It would be desirable to have a multiple temperature control system, to provide either warmer air or cooler air selectively to either the passenger positions or the driver position within the passenger compartment of a motor vehicle.

SUMMARY OF THE INVENTION

Accordant with the present invention, a multiple temperature control system for an automotive vehicle has surprisingly been discovered. The system comprises:

A) an intake duct, for receiving substantially all of the air from a motor vehicle air conditioner/heater unit;

B) first and second ducts communicating with the intake duct, for receiving the flow of air from the intake duct;

C) first and second registers communicating with the first and second ducts, respectively, for directing air from the first and second ducts, respectively, toward the driver position and passenger position, respectively, within the passenger compartment of a motor vehicle;

D) first and second supplemental heaters positioned within the first and second ducts, respectively, for selectively heating the air passing through said first and second ducts; and E) means for selectively, individually activating the first and second supplemental heaters.

The multiple temperature control system of the present invention is particularly well suited for selectively providing extra warm air to either the passenger side or driver side of the front passenger compartment of a motor vehicle or to the right- or left-hand sides of the rear passenger compartment of the vehicle.

DETAILED DESCRIPTION OF THE PREFERRED EMBODIMENT

Figure 1:
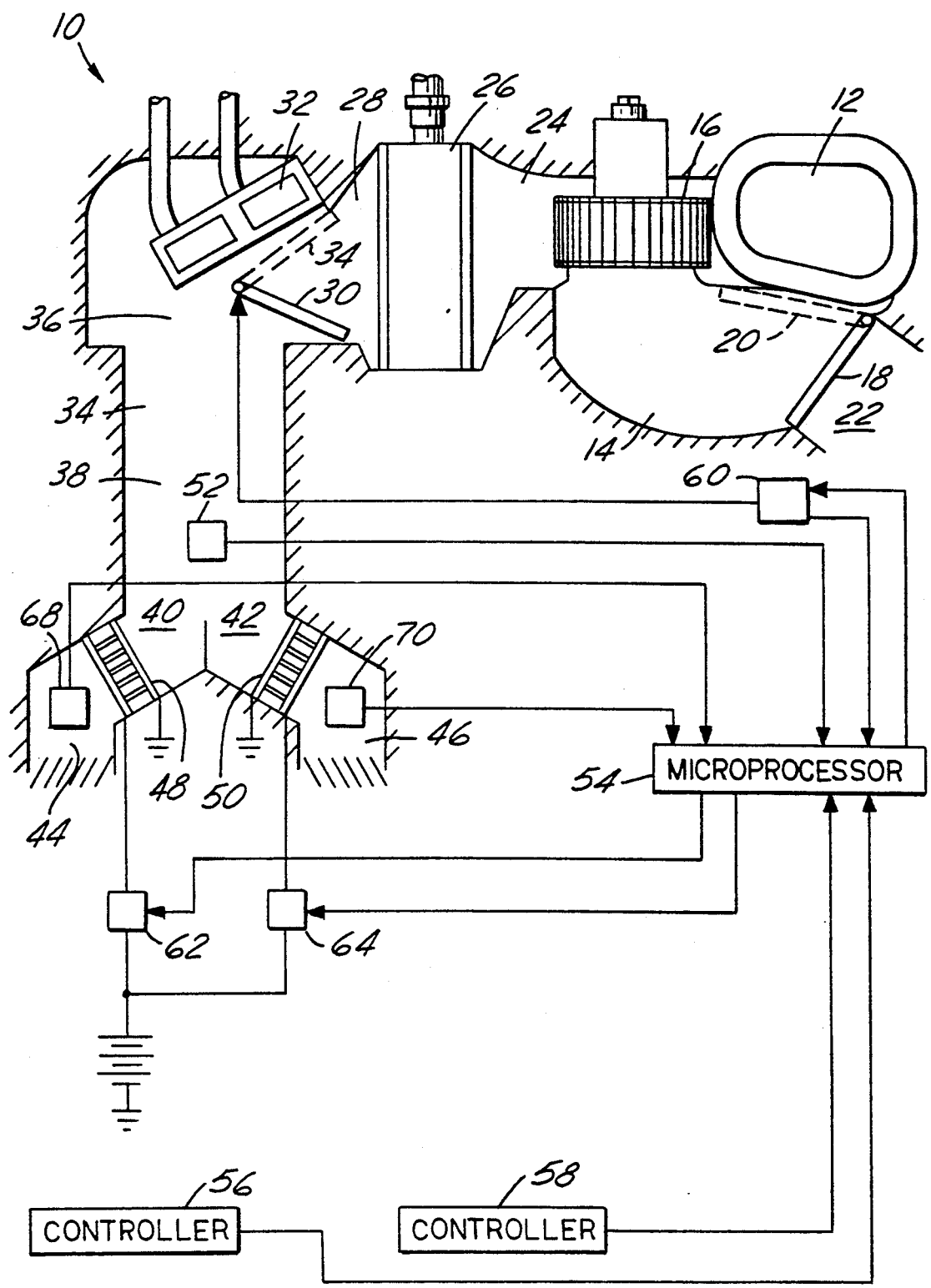
FIG. 1 is a schematic representation of a multiple temperature control system embodying the features of the present invention.

Referring now to the drawing, FIG. 1, there is shown generally at 10 a multiple temperature control system for a motor vehicle embodying the features of the present invention. Air may be admitted into the system 10 from the outside via an air inlet 12, and thereafter passed through an air supply duct 14 to a blower 16. A recirculation air door 18 selectively may be set to a full-air-recirculation position 20 indicated by the dotted line in FIG. 1, to prevent the flow of outside air from entering the supply duct 14 via the inlet 12, and to permit air to enter the supply duct 14 through a recirculation inlet duct 22. As will be evident to one ordinarily skilled in the art, the air door 18 may be set in an intermediate position to allow a combined flow of outside air and recirculation air to enter the supply duct 14 through the outside air inlet 12 and the recirculation air inlet 22.

Air from the supply duct 14 is urged through the balance of the multiple temperature control system 10 by the blower 16 which discharges the air into an evaporator supply duct 24. The air may be cooled and conditioned by passing through an evaporator 26, and thereafter discharged to a conditioned air supply duct 28. A blend door 30 functions to divert air from the conditioned air supply duct 28 through a heater core 32 when the blend door 30 is in a first position as indicated by the solid line in FIG. 1, and diverts air from the conditioned air supply duct 28 away from the heater core 32 when the blend door 30 is in a second position 34 indicated by the dotted line in FIG. 1. The blend door 34 may alternatively be set at an intermediate position to divert only a portion of the air from the conditioned air supply duct 28 through the heater core 32. Thus, air exiting the evaporator 26 may be at least partially heated before being blended in a blend chamber 36 and directed into an air distribution manifold intake duct 38 downstream from the blend door 30.

The operation of and interaction between the evaporator 26 and heater core 32 is well-known in the field of motor vehicle climate control systems, and will not be discussed in greater detail here. Depending upon the operation of the evaporator 26 and heater core 32, the air entering the blend chamber 36 may be unaffected by the evaporator 26 and/or heater core 32, or may be heated and/or cooled before entering the blend chamber 36. The climate control system components described to this point are conventional and designated herein as a "motor vehicle air conditioner/heater unit." Moreover any assemblage of conventional climate control system components, e.g., blowers, evaporators, heater cores, ducts, etc., designed to provide untreated air flow or heated and/or cooled air flow is also contemplated by the term "motor vehicle air conditioner/heater unit."

Substantially, all of the air from the conditioned air supply duct 28, whether or not cooled or heated by the evaporator 26 or the heater core 32, is directed into the air distribution manifold intake duct 38. By the term "substantially" as it is used herein is meant that the majority of the air forced through the motor vehicle air conditioner/heater unit by the blower 16 is directed into intake duct 38, to be distributed through the floor, panel, or other registers to the front seat occupants of the motor vehicle. The use of the term "substantially" thus contemplates that sidestreams of heated and/or cooled, conditioned air may be diverted away from the system 10 upstream from the intake duct 38 (not shown) for ancillary purposes such as windshield defrosting, side window defogging, rear seat passenger heating or cooling, etc.

Air entering the intake duct 38 is discharged into first 40 and second 42 ducts for distribution to the driver position and passenger position, respectively, within the motor vehicle through first 44 and second 46 registers, respectively. Although only single first and second registers are illustrated in FIG. 1, the invention contemplates a plurality of first registers which may discharge air toward the driver position at floor, panel, and intermediate levels, as well as a plurality of second registers which would direct air toward the passenger position in the same fashion. It should be readily apparent to one skilled in the art that the present invention further contemplates a plurality of additional registers for directing air to different positions in the rear passenger compartment of the vehicle in a manner similar to that described herein. The present invention is not meant to be limited solely to a system having only dual temperature control mechanisms but contemplates a third, fourth or even greater number of temperature control systems structured in accord with the principles described herein.

The first and second ducts 40 and 42 communicate air to the first and second registers 44 and 46, respectively. Positioned within the first and second ducts 40 and 42 are first 48 and second 50 supplemental heaters, respectively. These supplemental heaters 48 and 50 may be of any conventional design well-known in the motor vehicle heating art. FIG. 1 illustrates the use of electrical resistance positive temperature coefficient (PTC) heaters, although other heaters, such as engine coolant finned heat exchangers, may be used.

An intake duct temperature sensor 52 interacts with a conventional microprocessor 54, to communicate to the microprocessor 54 the temperature of the air entering the intake duct 38. A driver position controller 56 and a passenger position controller 58 interact with the microprocessor 54, to advise the microprocessor 54 of the temperature of the air desired by the driver and passenger to be discharged from the first and second registers 44 and 46, respectively. The microprocessor 54 determines the lower of the two desired temperatures communicated by the driver and passenger controllers 56 and 58, and responds thereto by signaling a blend door actuator 60 which drives the blend door 30 to a position such that the air entering the intake duct 38 is heated to the desired lower temperature as measured by the intake duct temperature sensor 52. Thus, for example, if the driver position controller 56 is set for a desired temperature of 70° F., and the passenger position controller 58 is set for a desired temperature of 75° F., the microprocessor 54 would position the blend door 30 via actuator 60 to allow heating of the air exiting the conditioned air supply duct 28 to result in a blended air temperature within the intake duct 38 of 70° F. as measured by the intake duct temperature sensor 52.

Simultaneously, the microprocessor 54 responds to the higher of the two desired temperatures communicated by the driver and passenger controllers 56 and 58 by signaling either a first 62 or second 64 current controller, respectively, to provide electrical current from a source 66 to one of the individually selected first or second PTC heaters 48 or 50, respectively. The amount of current supplied to either the first or second PTC heater 48 or 50 via either the first or second current controller 62 or 64, respectively, is determined by the microprocessor 54 in response to either an associated first 68 or second 70 register temperature sensor, respectively. Thus, considering the previous example in which the air temperature within the intake duct 38 is maintained at 70° F. in response to the lower desired 70° F. set point of the driver temperature control 56, if the passenger temperature controller 58 is set at a desired temperature of 75° F., the microprocessor 54 would activate the second current controller 64 to allow a controlled current to the second supplemental heater 50 to further heat the air to be discharged from the second register 46 to 75° F. as measured by the second register temperature sensor 70.

The apparatus illustrated in FIG. 1 provides a means for selectively activating individually the first 48 or second 50 supplemental heaters. Accordingly, the lower temperature air called for by either the driver or passenger of the automotive vehicle is provided by the motor vehicle air conditioner/heater unit, while the warmer heated air selected by the other one of the driver and passenger is provided by controlled activation of the supplemental heater positioned upstream of the registers directed toward his position within the vehicle.

It should be readily apparent to those skilled in the art the various modifications and alterations of the present invention are possible without departing from the spirit and scope of the present invention. For example, the present invention could be provided with a driver disable switch, allowing the driver to selectively disable the system and return full control of all zones back to the driver, such as when driving alone. It is the following claims, including all equivalents, which define the scope of the invention.

What is claimed is:

1. A multiple temperature control system for a motor vehicle, comprising:
   an intake duct, for receiving substantially all of the air from a motor vehicle air conditioner/heater unit;

first and second ducts communicating with the intake duct, for receiving the flow of air from the intake duct;

first and second registers communicating with the first and second ducts, respectively, for directing air from the first and second ducts, respectively, toward the driver position and passenger position, respectively, within the passenger compartment of a motor vehicle;

first and second supplemental heaters positioned within the first and second ducts, respectively, for selectively heating the air passing through said first and second ducts; and means for selectively, individually activating the first and second supplemental heaters further comprising:

an intake duct temperature sensor, for sensing the temperature of the air discharged from the air conditioner/heater unit;

first and second controllers, for establishing the desired temperatures for the driver position and passenger position, respectively, within the passenger compartment of the motor vehicle;

a microprocessor for receiving input from the intake duct temperature sensor and from the first and second controllers;

means responsive to the microprocessor for controlling the temperature of the air discharged from the air conditioner/heater unit to a temperature substantially equal to the lower of the temperatures established by the first and second controllers; and means responsive to the microprocessor for activating one of the first and second supplemental heaters to heat a portion of the air discharged from the air conditioner/heater unit to a temperature substantially equal to the higher of the temperatures established by the first and second controllers.

2. The multiple temperature control system according to claim 1, wherein the first and second supplemental heaters are each, individually electrical resistance heaters.

3. The multiple temperature control system according to claim 2, wherein the first and second supplemental heaters are positive temperature coefficient heaters.

4. The multiple temperature control system according to claim 1, wherein the first and second supplemental heaters are each, individually electrical resistance heaters.

5. The multiple temperature control system according to claim 1, wherein the first and second supplemental heaters are positive temperature coefficient heaters.

6. The multiple temperature control system according to claim 1, wherein the means responsive to the microprocessor for activating one of the first and second supplemental heaters comprises first and second temperature sensors downstream from the first and second supplemental heaters, respectively, for detecting the temperature of the air being discharged from the first and second registers, respectively, said first and second temperature sensors providing input to the microprocessor.

7. The multiple temperature control system according to claim 6, wherein the first and second supplemental heaters are each, individually electrical resistance heaters.

8. The multiple temperature control system according to claim 6, wherein the first and second supplemental heaters are positive temperature coefficient heaters.

9. The multiple temperature control system according to claim 7, wherein first and second current controllers responsive to the microprocessor selectively, individually control the amount of electrical current provided to the first and second supplemental heaters, respectively.

10. The multiple temperature control system according to claim 8, wherein first and second current controllers responsive to the microprocessor selectively, individually control the amount of electrical current provided to the first and second positive temperature coefficient heaters, respectively.

11. The multiple temperature control system according to claim 1, wherein the means responsive to the microprocessor for controlling the temperature of the air discharged from the air conditioner/heater unit comprises:

a blend door actuator for positioning a blend door within the air conditioner/heater unit to blend together streams of air having differing temperatures.

12. The multiple temperature control system according to claim 11, wherein the first and second supplemental heaters are each, individually electrical resistance heaters.

13. The multiple temperature control system according to claim 11, wherein the first and second supplemental heaters are positive temperature coefficient heaters.

14. A dual temperature control system for a motor vehicle, comprising:

A) an intake duct for receiving substantially all of the air from a motor vehicle air conditioner/heater unit;

B) first and second ducts communicating with the intake duct, for receiving the flow of air from the intake duct;

C) first and second registers communicating with the first and second ducts, respectively, for directing air from the first and second ducts, respectively, toward the driver position and passenger position, respectively, within the passenger compartment of a motor vehicle;

D) first and second supplemental electrical resistance heaters positioned within the first and second ducts, respectively, for selectively heating the air passing through said first and second ducts;

E) an intake duct temperature sensor, for sensing the temperature of the air discharged from: the air conditioner/heater unit;

D) first and second controllers, for establishing the desired temperatures for the driver position and passenger position, respectively, within the passenger compartment of the motor vehicle;

G) first and second temperature sensors downstream from the first and second supplemental heaters, respectively, for detecting the temperature of the air being discharged from the first and second registers, respectively;

H) a microprocessor for receiving input from the intake duct temperature sensor, the first and second controllers, and the first and second temperature sensors;

I) a blend door actuator responsive to the microprocessor for positioning a blend door within the air conditioner/heater unit to blend together streams of air having differing temperatures to control the temperature of the air discharged from the air conditioner/heater unit to a temperature substantially equal to the lower of the temperatures established by the first and second controllers; and J) first and second current controllers responsive to the microprocessor for selectively, individually controlling the amount of electrical current provided to the first and second supplemental electrical resistance heaters, respectively, to heat a portion of the air discharged from the air conditioner/-heater unit to a temperature substantially equal to the higher of the temperatures established by the first and second controllers.

15. The dual temperature control system according to claim 14, wherein the supplemental electrical resistance heaters are each, individually positive temperature coefficient heaters.

* * * * *